US005624365A

United States Patent [19]
Haninger et al.

[11] Patent Number: 5,624,365
[45] Date of Patent: Apr. 29, 1997

[54] MACHINE TOOL

[75] Inventors: Rudolf Haninger, Seitingen; Hans-Henning Winkler, Tuttlingen, both of Germany

[73] Assignee: Chiron-Werke GmbH & Co. KG, Tuttlingen, Germany

[21] Appl. No.: 489,759

[22] Filed: Jun. 13, 1995

[30] Foreign Application Priority Data

Jun. 18, 1994 [DE] Germany .......................... 44 21 385.9

[51] Int. Cl.[6] .................................................. B23Q 3/155
[52] U.S. Cl. ................................................ 483/50; 483/38
[58] Field of Search ............................ 483/1, 47, 3, 45, 483/32, 48, 46, 49, 36, 38, 50

[56] References Cited

U.S. PATENT DOCUMENTS 4,557,035 12/1985 Ruetschle et al. ..................... 483/47
5,201,695 4/1993 Ruetschle et al. ...................... 483/3

FOREIGN PATENT DOCUMENTS

| 1552417 | 1/1974 | Germany . | |
|---|---|---|---|
| 3503637 | 8/1986 | Germany | 483/47 |
| 3521009C2 | 7/1988 | Germany . | |
| 3320851C2 | 5/1989 | Germany . | |
| 3831869C2 | 1/1992 | Germany . | |

*Primary Examiner*—William R. Briggs
*Attorney, Agent, or Firm*—Pretty, Schroeder, Brueggemann and Clark

[57] ABSTRACT

A machine tool (10) has a revolving spindle (14) borne in a spindle tube (13) which has a locating opening (15) to receive tool holders; (16, 17). A tool magazine (55) is also provided to hold a number of tool holders. Moreover, a tool changer (18) with at least two gripper arms (21, 22) is provided to transport tool holders; (16, 17) between a transfer position (23) in the area of the tool magazine (55) and a common spindle position (24) beneath the locating opening (15). A holding device (31) bearing the tool changer (18) is borne on the spindle tube (13) in such a way that it can be moved longitudinally in the sense of a stroke movement (33) and transfer the respective tool holder (16) from the spindle position (24) into its working position in the locating opening (15). The holding device (31) is borne on the spindle tube (13) along its longitudinal axis so that it can be rotated in such a way that the gripper arms (21, 22) have a common transfer position (23) to the tool magazine (55).

10 Claims, 3 Drawing Sheets

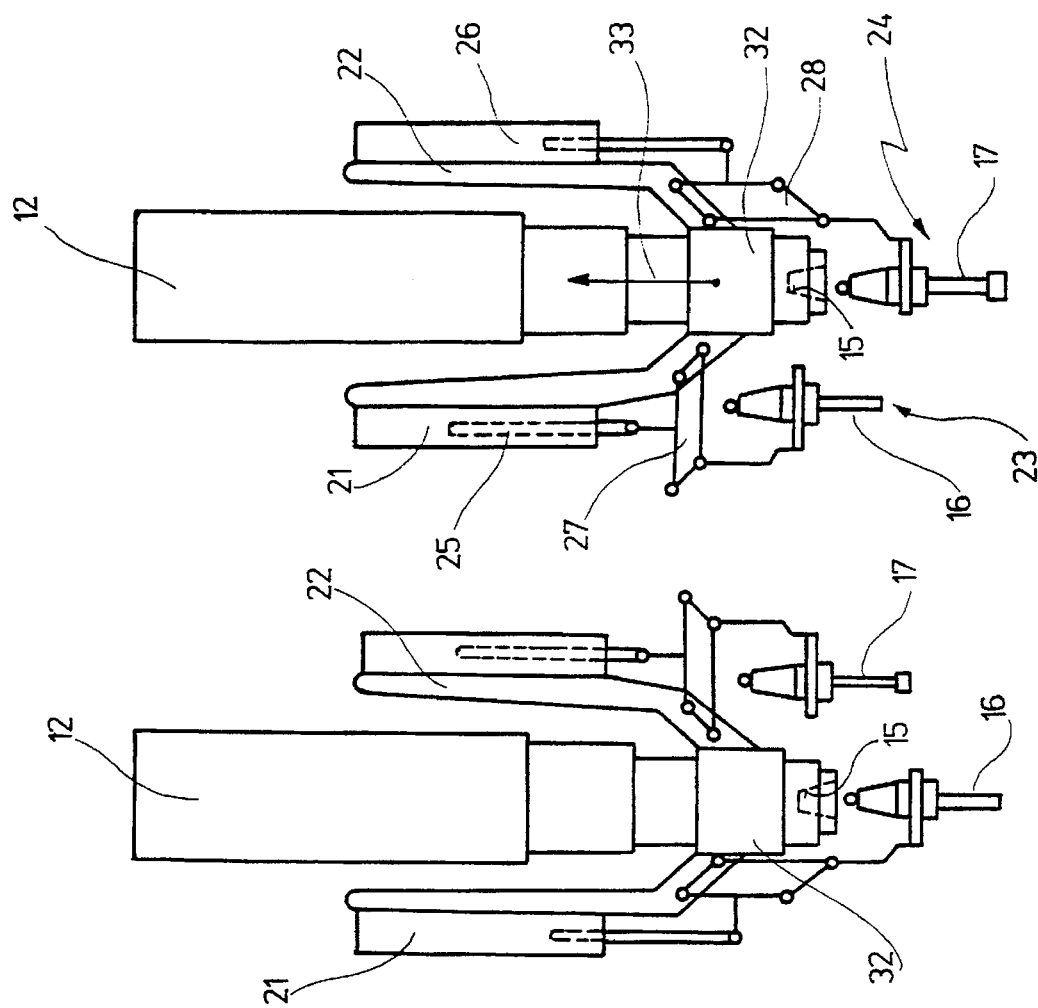
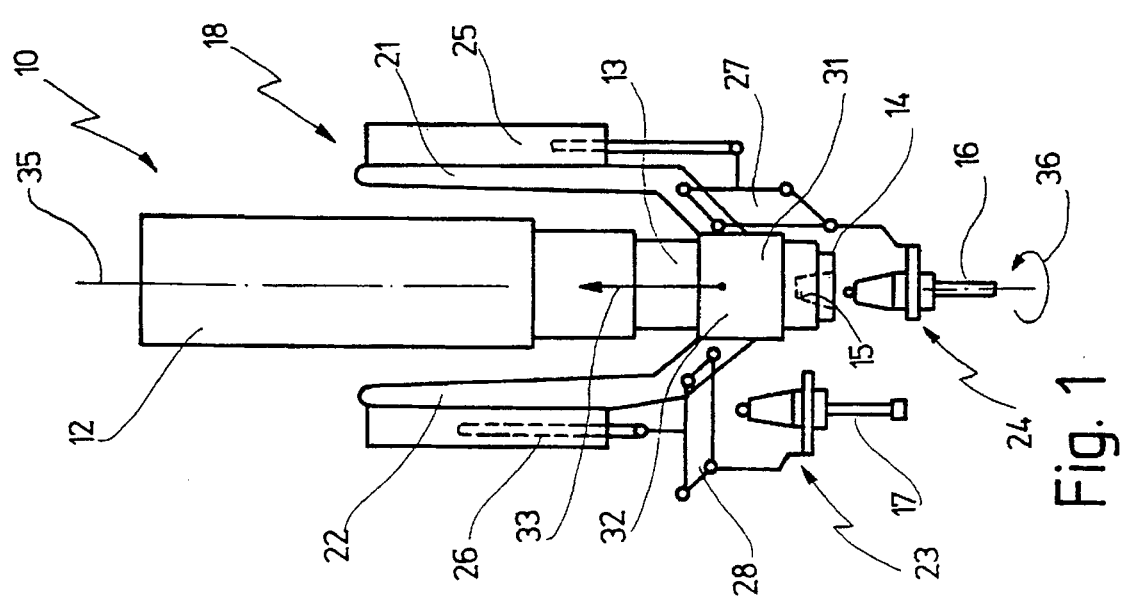

MACHINE TOOL

BACKGROUND OF THE INVENTION

The present invention relates to a machine tool with a revolving spindle borne in a spindle tube which has a receiving or locating opening to receive tool holders, a tool magazine to hold a number of tool holders, a tool changer with at least two gripper arms to transport tool holders between a respective transfer position in the area of the tool magazine and a common spindle position beneath the locating opening and a holding device bearing the tool changer, which device is borne on the spindle tube in such a way that it can be moved longitudinally in the sense of a stroke movement and which transfers the respective tool holder from the spindle position into its working position in the locating opening.

Such a machine tool is known from DE-A-35 21 009.

In the known machine tool the tool magazine is in the shape of a horseshoe. Each of the two gripper arms is assigned its own transfer position from one or the other end of the horseshoe. The two gripper arms are arranged on different sides of the spindle tube which is located between the ends of the magazine's limbs.

The holding device for the two gripper arms is a sleeve located on the spindle tube and which can be moved in a longitudinal direction and whose stroke movement shifts the tool holder, which is located beneath the spindle, between its spindle position and its working position and at the same time moves the tool holder, which is in the transfer position, either upwards or downwards and thus enables its transfer into or removal from the magazine.

As already mentioned, the two gripper arms work on opposite sides of the spindle tube in such a way that if the tool holder of one of the gripper arms is in the lower spindle position the other gripper arm is swivelled laterally in such a way that its tool holder is in the transfer position. The positions of the tool holders held by the gripper arms can be exchanged by swivelling the gripper arms with hydraulic or pneumatic piston-cylinder units so that the other tool holder is now in the common spindle position whereas the first tool holder is in its assigned transfer position.

A tool change can be carried out very quickly with this machine tool but such a machine has to be built very wide such that it projects comparably on either side of the spindle tube since enough space has to be left to the left and right of the headstock for the swivel movement of each arm.

However, it is often desirable for a machine tool to have a number of spindle tubes arranged alongside one another in a minimum of space. In the case of the known machine tool the minimum distance between two spindle tubes would then have to be twice the maximum lateral swivel width of a gripper arm. A double-spindle machine, for example, would thus have to be built very wide.

In order to solve this problem a machine tool is already known from DE-A-38 31 869 in which two gripper arms and a tool magazine are also provided, though the two gripper arms each serve a common transfer position. The two gripper arms are thus arranged on opposite sides of the spindle tube and are :swivelled in such a way that they cross over and avoid contact with one another along complicated locus curves which meet at the end points, resulting in not only a common spindle position but also a common transfer position.

This machine tool is also suitable for double spindle machines since it can be built with a small overall width. The locus curves are guided via a crank element which can be moved longitudinally and which acts upon the gripper arms via two ball-and-socket-joint mechanisms.

The disadvantage of this machine tool is that the gripper arms and their drives are of a very complicated design and that a special transfer device is required to transfer the tool holder between the gripper arm in the transfer position and a corresponding gripper in the tool magazine on account of the complicated locus curves.

Although this machine tool has proven its worth in operation, its construction is nevertheless regarded as very complicated.

SUMMARY OF THE INVENTION

In view of the above it is an object of the present invention to design a machine tool which needs little lateral space in the area of the tool changer but which is nevertheless of a constructionally simple design.

In accordance with the invention this object is achieved for the machine tool mentioned at the outset inasmuch as the holding device is borne on the spindle tube along its longitudinal axis so that it can be rotated and in such a way that the gripper arms have a common transfer position to the tool magazine.

The object underlying the invention is thus completely solved. The revolving or rotatable sleeve means that the essentially identical gripper arms can be alternately rotated into the common transfer position so that only one magazine and one transfer position are necessary. The rotation can be carried out with the holding device in a position in which the protruding gripper arms do not collide with other parts of the machine tool. This means that a surprising combination of the two machine tools as known from the publications mentioned at the beginning has been found. On the one hand the simple gripper arms and their uncomplicated actuation mechanisms described in DE-A-35 21 009 can be used, whereas on the other hand one does not have to forego the further advantages of the low space requirements and the common transfer position as described in DE-A-38 31 869.

It is particularly preferable if a rotary actuator is provided which optionally rotates the holding device along its longitudinal axis between two extreme positions.

The advantage of this is that only little work is required for the peripheral equipment. The holding device, which can, for example, be a sleeve, is namely moved in a straight line upwards or downwards on the spindle tube whereby the sleeve is rotated by a special drive in the lower position. The advantage of this is that the magazine can be located lower in the longitudinal direction of the spindle tube since the gripper arm is only rotated and swivelled when the sleeve has been moved fully down. It is no longer necessary to withdraw a separate bag provided in the area of the machine tool to protect the tool holder against dirt, before the tool holder is removed laterally. This was especially necessary during the known swivelling of the gripper arms along the complicated locus curves so that the tool holder could be released from its bag. In the new machine tool the tool holder is automatically released from the bag, as it were, when the holding device is lowered, thus leading to the aforementioned simplification of the peripheral equipment.

It is furthermore preferable if a rotary mechanism which functions depending on the stroke movement is provided to optionally rotate the holding device along its longitudinal axis between two extreme positions.

The advantage of this is that no separate drive is needed for the rotary movement but that this takes place depending on the stroke movement. In this way the constructional design of the new machine tool can also be simplified.

It is then preferable if the holding device comprises a sleeve borne on the outer ground surface of the spindle tube in such a way that it can be moved and rotated in sections.

The advantage of this is that the in itself known sleeve and its in any case planned guidance can also be used to realise the rotary movement. In other words, the in itself known sleeve is given a further freedom with respect to its rotation around the spindle tube, which surprisingly leads to the advantages already described above.

It is furthermore preferable if the rotary mechanism includes a locking pin which can be optionally engaged with a control cam or curve on the spindle tube whereby the control cam is shaped in such a way that if the locking pin is engaged the holding device is forced to rotate during the stroke movement.

The advantage of this is that the stroke movement simultaneously triggers the rotary movement through the engagement of the locking pin whereas if the locking pin is disengaged the stroke movement is carried out without the rotary movement. In this way the holding device can be rotated in the down stroke during a first tool change whereby no rotation takes place after the gripper arms have changed their positions during an up stroke. During the subsequent second tool change no rotary movement is carried out during the down stroke whereas after the gripper arms have changed their position the rotary movement is carried out during the up stroke and thus in the opposite direction. In other words, the holding device is rotated by a certain angle in the first direction at the start of the first tool change and remains in this position during the subsequent processing of a work piece with the clamped tool. Only after the next tool has been changed the holding device is rotated back into its original starting position during the up stroke.

It is then particularly preferable if the holding device displays a locking device which optionally locks the holding device to the spindle tube.

The advantage of this is that this simple mechanical feature ensures that during a stroke movement where no rotation is desired, no accidental rotation of the holding device around the spindle tube does in fact take place.

It is hereby preferable if the locking device display an indexing pin which optionally engages in a bore hole which cannot be rotated around but slid along the spindle tube.

This measure too is advantageous from a constructional point of view since the indexing pin, which can be operated for example by a piston-cylinder unit, brings about a simple, optional locking.

It is furthermore preferable if the control cam is bent into an S-shape and has a top end which runs parallel to the longitudinal axis.

The advantage of this is that the aforementioned bag can tightly enclose the tool holder in the transfer position since this is then moved a short distance vertically downwards if the stroke movement is linked to the rotary movement.

On the whole it is preferable if the two gripper arms are arranged at an angle of less than 90° and preferably approx. 60° to each other around the spindle tube.

The advantage of this is that both gripper arms are arranged on one side of the spindle axis, as it were, so that the overall width of the new machine tool can once again be significantly reduced. A double spindle machine can now be built, for example, of two spindle tubes whose gripper arms and holding devices are designed as mirror-images of one another so that only very little space is required between the two spindle tubes. Thus, on the whole the overall width of a double spindle machine built according to the invention is once again considerably less than that of the machine tool known from DE-A-38 31 869.

It is then preferable if the locking pin and locking device operate alternately in such a way that the holding device is rotated in an initial direction during a stroke movement and locked with the spindle tube during a stroke movement in the opposite direction.

This measure leads to the advantage already discussed above, namely that only one swivel range of 60° is necessary to rotate the sleeve and thus the gripper arm around the spindle tube so that the overall space requirements can be kept small.

BRIEF DESCRIPTION OF THE DRAWING

Further advantages arise from the description and the enclosed drawing.

It is understood that the features mentioned above and those to be explained in the following are applicable not only for the specified combinations but also in other combinations or on their own without going beyond the scope of the present invention.

Figure 4:
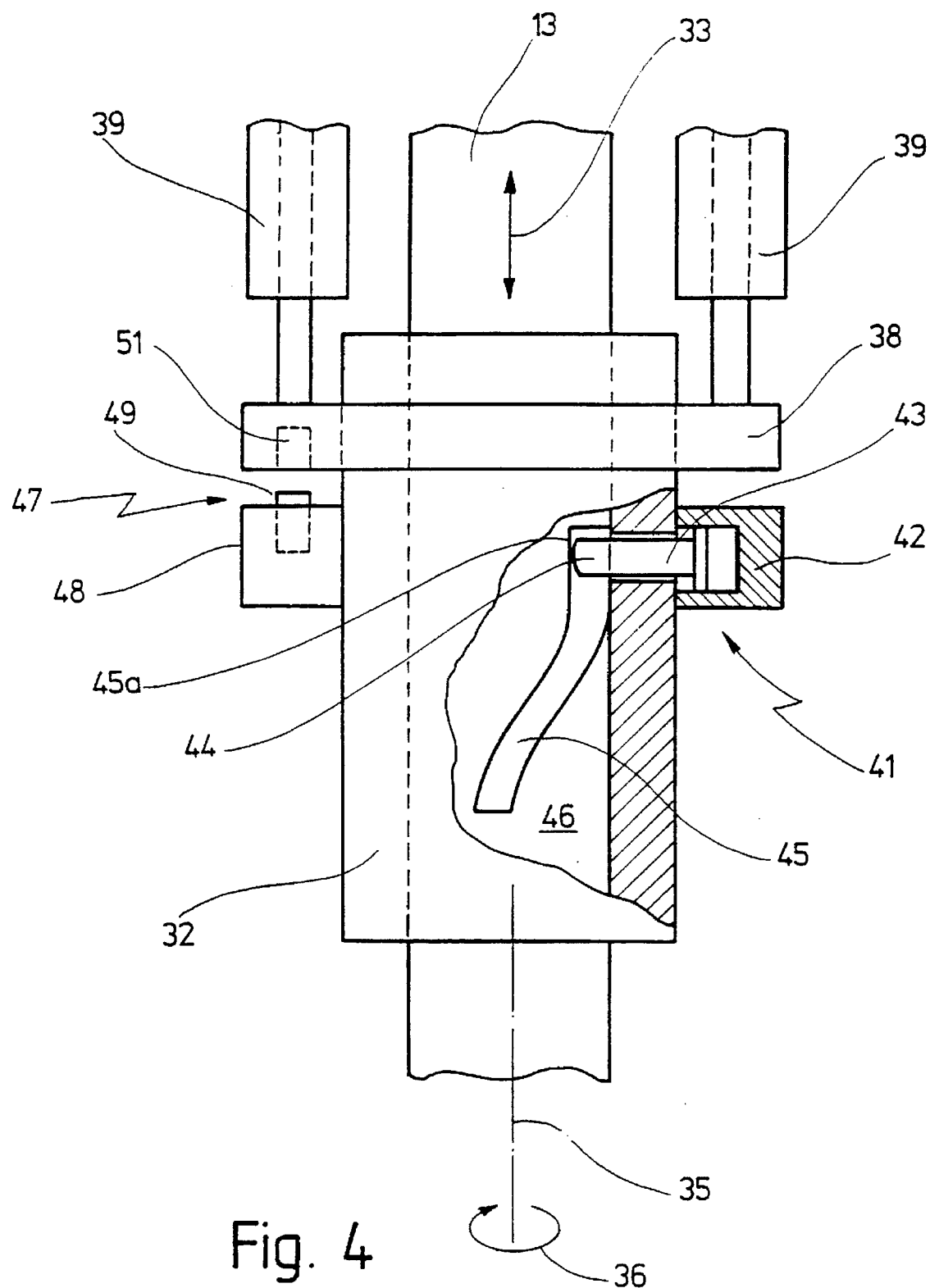
Figure 5:
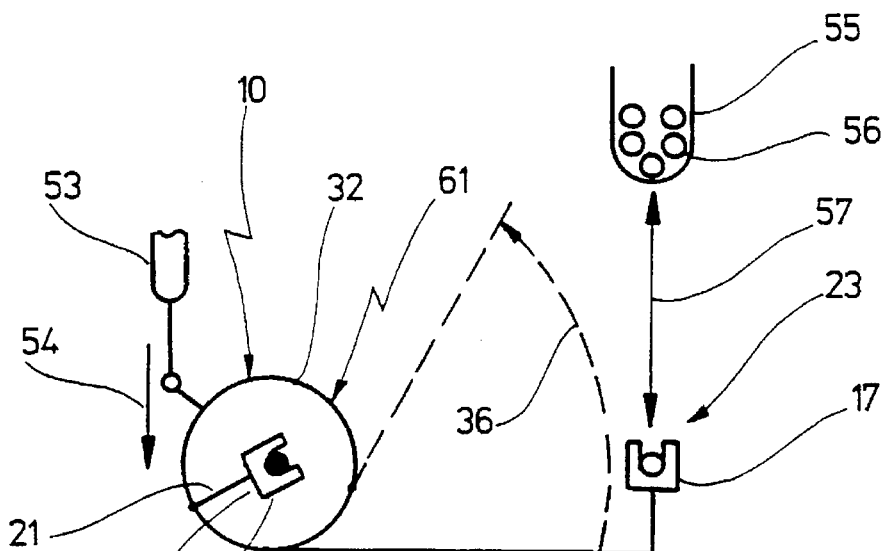
Figure 6:
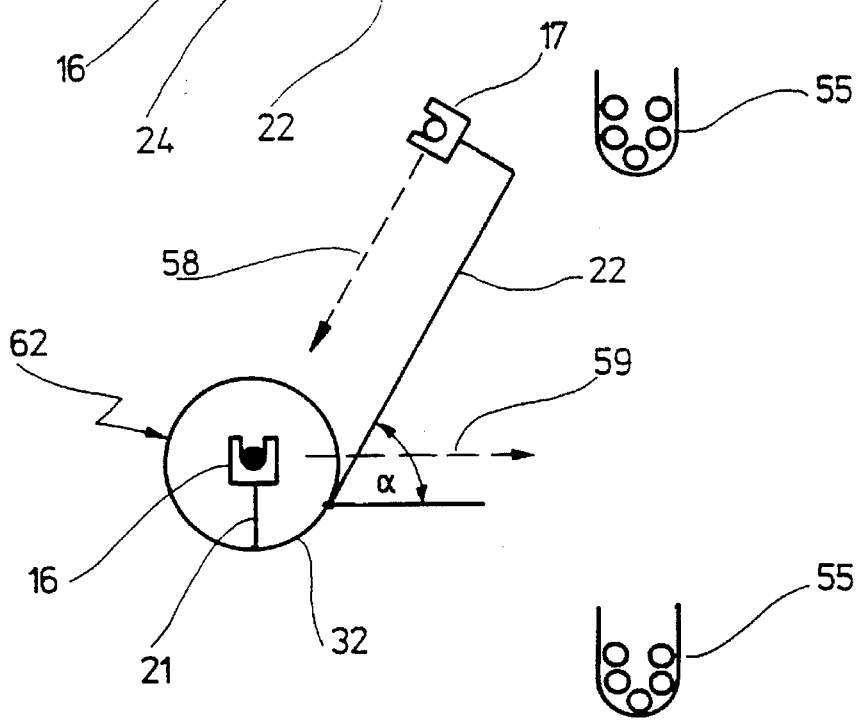
Figure 7:
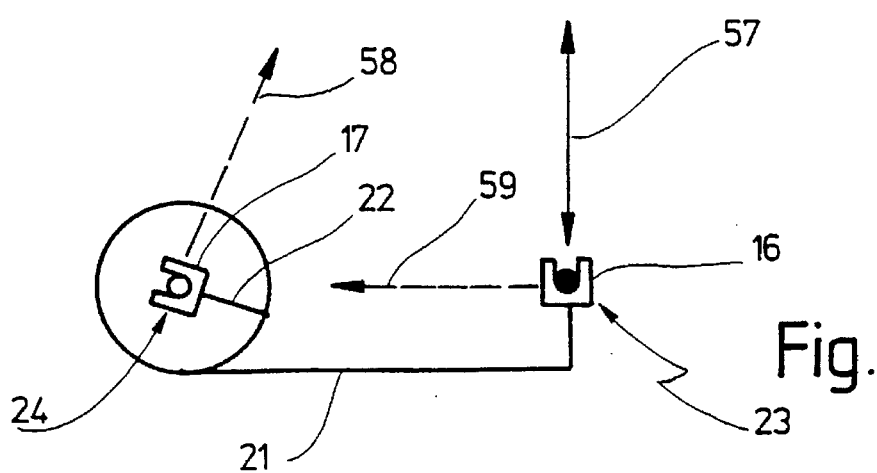

One embodiment of the invention is shown in the drawing and will be described in more detail in the following explanation. The illustrations show the following:

FIG. 1 a machine tool in accordance with the invention in which a first tool is in the spindle position and a second tool in the magazine position;

FIG. 2 the machine tool from FIG. 1 whereby the sleeve has been rotated;

FIG. 3 the machine tool from FIG. 2 whereby both gripper arms have changed their positions so that the first tool is now in the magazine position and the second in the spindle position;

FIG. 4 the machine tool from FIG. 1 as a section in the area of the sleeve which is partially cut away to show the construction of the rotary mechanism;

FIG. 5 a machine tool as in FIG. 1 though in a very simplified top view and with gripper arms arranged at 60° to one another;

FIG. 6 a representation as in FIG. 5 through where the sleeve has been lowered and rotated; and FIG. 7 a representation as in FIG. 6 where the two gripper arms have changed their positions.

DESCRIPTION OF THE PREFERRED EMBODIMENT

In FIG. 1, 10 generally indicates a machine tool which displays a headstock 12 whose lower end passes over into a spindle tube 13. A spindle 14 whose lower end displays a locating hole 15 for tools 16, 17, as is generally known, is pivot-borne in the spindle tube 13.

Moreover, a tool changer 18 comprising two gripper arms 21 and 22 is provided to transport the tool holders 16, 17 between a transfer position 23 in the area of a tool magazine not shown in FIG. 1 and a common spindle position 24 below the locating hole 15. To this end, the gripper arms 21, 22 each comprise a piston-cylinder unit 25, 26 via which parallelogram rod assemblies 27, 28 are actuated. In FIG. 1 the parallelogram rod assembly 27 is extended so that the first tool holder 16 is in the spindle position. The parallelogram rod assembly 28 is conversely retracted so that the tool holder 17 is in its transfer position 23.

The two gripper arms 21, 22 are fastened to a common holding device 31 which in the design variant shown here is a sleeve 32 which is borne on the spindle tube 13 in such a way that it can be shifted longitudinally in the direction of an arrow 33.

The machine tool described up to now corresponds to the machine tool known from DE-A-33 20 851, the complete contents of which herewith become an integral part of the present application.

In FIG. 1 a longitudinal axis of the spindle tube 13 is shown as 35 around which the sleeve 32 can be rotated in the new machine tool from FIG. 1, as indicated by the arrow 36.

In FIG. 1 the sleeve 32 is lowered so that the tool holder 16 is released from the locating hole 15. The sleeve 32 is now rotated around 180° for the further tool change procedure, resulting in the position shown in FIG. 2. Whereas the ejected tool holder 16 is still below the locating hole 15, the tool holder 17 to be changed is now diametrical to its former transfer position 23.

The parallelogram rod assembly 27 is now retracted and at the same time the parallelogram rod assembly 28 extended so that the locations and positions of the two gripper arms 21 and 22 are exchanged. The second tool holder 17 is now in spindle position 24 whereas the first tool holder 16 in transfer position 23. By carrying out a stroke in the stroke direction 33 the sleeve 32 now moves the tool holder 17 into the locating hole 15 and the tool holder 16 into a position in the area of the machine tool not shown here.

In the case of the machine tool shown in FIGS. 1-3 the two gripper arms 21, 22 lie diametrically opposed along the longitudinal axis 35 of the spindle tube 13 so that the sleeve 32 performs a 180° rotation. However, the radial distance between the two gripper arms 21, 22 can be much less than 180° depending on the design. The sleeve 32 can either be rotated by its own rotary actuator during the stroke movement, as is described below in connection with FIGS. 5-7, or a forced rotation may also be performed, as described in connection with FIG. 4.

FIG. 4 shows a sectional diagram of the machine tool from FIGS. 1-3 in the area of the sleeve 32, whereby further details are shown and the sleeve 32 has been partially cut away.

A ring 38 is attached to the sleeve 32 in which piston-cylinder units 39 engage via which the sleeve 32 can be adjusted in the direction of the arrow 33.

A rotary mechanism 41, via which the stroke movement can be converted into a rotary movement, is shown in the cut part of the sleeve 32. A further piston-cylinder unit is provided for this purpose which moves a locking pin 43, the front end of which is shaped like a roller 44. The roller 44 can be optionally engaged with a control cam 45 which is provided in the ground outer surface 46 of the spindle tube 13 via the piston-cylinder unit 43. The control cam 45 is S-shaped and extends radially over approx. 60° of the circumference of the spindle tube 13. In the direction of the longitudinal axis 35 the extent of the control cam 45 corresponds to the maximum stroke performed by the sleeve 32.

The upper end 45a of the control cam displays a section which runs parallel to the longitudinal direction 35 so that the rotary movement of the sleeve 32 only begins when this has been lowered slightly. In this way it can be ensured that the tool holder 16, 17 is initially released vertically downwards from the locating hole 15 or a bag in the tool magazine before being rotated during lowering of the sleeve 32. The upper, straight section 45a of the control cam 45 thus prevents the tool holder 16, 17 from jamming.

When the locking pin 43 is retracted from the control cam 45 the sleeve 32 of course does not rotate. In order to prevent an accidental rotation of the sleeve 32 in this state a locking device 47 is also provided via which the sleeve can be locked to the spindle tube 13. The locking device 47 comprises a piston-cylinder unit 48 which can optionally engage an indexing pin 49 into a bore hole 51 provided in the ring 38. Since the ring 38 is connected to the piston-cylinder unit 39 in such a way that it cannot be rotated, and this in turn is a fixed part of the new machine tool 10 just like the spindle tube 13, the sleeve 32 is thus locked to the spindle tube. To prevent any jamming during the rotation of the sleeve 32 the ring 38 is of course pivot-borne on the sleeve 32.

The control for the rotary mechanism 41 and the locking device 47 is such that either the indexing pin 49 engages in the bore hole 51 or the roller 44 is engaged in the control cam 45. The task of the roller 44 is also to avoid frictional forces during the forced rotation of the sleeve 32.

In the schematic diagram of the top view of the machine tool 10 shown in FIGS. 5-7, either the rotary mechanism 41 with locking device 47 according to FIG. 4 or a special rotary actuator 53 can be provided, as indicated in FIG. 5. The rotary actuator 53 converts a linear movement 54 into a rotation of the sleeve 32; its operation will be explained below, following an explanation of the operation of the rotary mechanism 41.

FIG. 5 shows the state as shown in FIG. 1, the first tool holder 16 is in the spindle position 24 whereas a second tool holder 17 is in the transfer position 23 in the vicinity of a tool magazine 55. The tool magazine 55 contains further tool holders 56 which can be exchanged with the tool holder 17 in the direction of an arrow 57.

It is assumed that the tool held by the tool holder 16 has just completed work on a work piece not shown here and that the tool holder 17 carries the next tool to be inserted into the locating hole 15. In order to perform this action the sleeve 32 is lowered so that the tool holder 16 is released from the locating hole 15. At the end of the stroke movement the sleeve 32 is swivelled in the direction of the arrow 36 so that the position shown in FIG. 6 is reached. It should be noted that if the rotary mechanism 41 from FIG. 4 is used the swivel movement in the direction of the arrow 36 is carried out during the lowering of the sleeve 32, whereas if the rotary actuator 53 is used this swivel movement is only carried out at the end of the stroke movement.

In the case of the machine tool shown in FIGS. 5-7 the gripper arms 21, 22 are spaced around the sleeve 32 at an angle of approx. 60° so that the rotary movement of the sleeve 32 must also be exactly 60°. This angle is indicated in FIG. 6 by α.

In the position shown in FIG. 6 the positions of the gripper arms 21, 22 are now exchanged. The gripper arm 22 moves the tool holder 17 through a change movement 58 below the spindle whereas the gripper arm 21 simultaneously moves the tool holder 16 through a change movement 59. These change movements 58, 59 an be carried out simultaneously in the case of smaller tools whereas the change movement 59 should be carried out first followed by the change movement 58 in the case of larger tools on account of the risk of collisions.

It should be noted that when moving from FIG. 5 to FIG. 6 the sleeve 32 is shifted from its first extreme position 61 into the second extreme position 62, whereby the two extreme positions 61, 62 differ by exactly the angle α.

Once the change movements 58, 59 have been carried out the position shown in FIG. 7 is reached; the tool holder 16 is now in the transfer position 23 whereas the tool holder 17 is in the spindle position 24. The sleeve 32 is now moved upwards without a rotary movement so that the tool holder 17 can engage in the locating hole 15. If the device shown in FIG. 4 is used this means that the indexing pin 49 engages in the bore hole 51 whereas the roller 44 is released from the control cam 45.

When processing of the work piece by the tool held in the tool holder 17 has been completed the next tool change is carried out in exactly the reverse manner to the tool change described above.

Firstly the sleeve 32 is lowered, whereby this does not rotate. The gripper arms 21, 22 then perform the change movements 58, 59 so that the position as shown in FIG. 6 is reached. When the sleeve 32 is raised the rotary movement is now performed so that the position as shown in FIG. 5 is finally reached.

In other words, the sleeve 32 rotates in opposite directions at the beginning of the first and end of the second tool change so that the sleeve 32 is always rotated to and fro between the extreme positions 61 and 62.

The use of the special rotary actuator 53 as shown in FIG. 5 leads to further advantages which on the whole lead to savings in time. During the changeover from FIG. 5 to FIG. 6 and FIG. 7 the sleeve 32 is initially lowered and then rotated in the direction of the arrow 36 by the rotary actuator 53. At the same time the gripper arms 21, 22 can exchange positions so that the change movements 58, 59 are performed during the rotation of the sleeve 32 in the direction of the arrow 36.

Whereas the lowering and rotation are performed simultaneously if the rotary mechanism 41 is used, the special rotary actuator 53 enables the simultaneous rotation of the sleeve 32 and swivelling of the gripper arms 21, 22, leading to great time savings.

Moreover, the special rotary actuator 53 can be designed in such a way that the sleeve 32 is rotated at different speeds depending on the weight of the tools. In the simplest case the rotary actuator has 2 speeds, whereby the slower speed is used for the rotation of heavier tools.

From FIGS. 5-7 it becomes clear that a second sleeve whose gripper arms are arranged exactly mirror-inverted to the gripper arms 21, 22 can be arranged to the left of the sleeve 32 so that the overall width of such a double spindle machine tool is only larger by the diameter of the sleeve 32 than would be the case for the machine tool shown in FIGS. 1-3 where both gripper arms 21, 22 are diametrically opposed to one another.

Therefore, what is claimed is:

1. A machine tool, comprising:

a spindle tube having a longitudinal axis;

a spindle rotatably mounted in said spindle tube and comprising at its lower end a receiving opening for locating tool holders in their working position;

a tool magazine for holding tool holders to be inserted into said receiving opening;

a tool changer having at least two gripper arms for transporting tool holders between a respective transfer position located in the area of said tool magazine and a common spindle position located beneath the receiving opening in said spindle, and vice versa; and a holding device bearing said tool changer and located on the spindle tube for longitudinal movement with respect to the latter in the sense of a stroke movement, and for rotational movement around the longitudinal axis thereof, during said stroke movement a tool holder being transferred between its working position and its spindle position or vice versa; and during said rotational movement said gripper arms changing position such that tool holders carried by said gripper arms have a common transfer position to the tool magazine.

2. The Machine tool of claim 1, wherein a rotary actuator is provided which optionally rotates the holding device along its longitudinal axis between two extreme positions.

3. The machine tool of claim 1, wherein a rotary mechanism which functions depending on the stroke movement is provided to optionally rotate the holding device along its longitudinal axis between two extreme positions.

4. The machine tool of claim 1, wherein the holding device comprises a sleeve borne on the outer ground surface of the spindle tube in such a way that it can be moved and rotated in sections.

5. The machine tool of claim 3, wherein the rotary mechanism includes a locking pin which can be optionally engaged with a control cam on the spindle tube whereby the control cam is shaped in such a way that if the locking pin is engaged the holding device is forced to rotate during the stroke movement.

6. The machine tool of claim 1, wherein the holding device displays a locking device which optionally locks the holding device to the spindle tube.

7. The machine tool of claim 6, wherein the locking device displays at least one indexing pin which optionally engages in a bore hole which cannot be rotated around but slid along the spindle tube.

8. The machine tool of claim 5, wherein the control cam is bent into an S-shape and has a top end which runs parallel to the longitudinal axis.

9. The machine tool of claim 1, wherein the two gripper arms are arranged at an angle of less than 90° and preferably approx. 60° to each other around the spindle tube.

10. The machine tool of claim 5 and claim 6, wherein the locking pin and locking device operate alternately in such a way that the holding device is rotated in an initial direction during a stroke movement and locked with the spindle tube during a stroke movement in the opposite direction.

* * * * *